(12) United States Patent  (10) Patent No.: US 8,533,596 B2
Boss et al.  (45) Date of Patent: Sep. 10, 2013

(54) SHARING VIRTUAL SPACE IN A VIRTUAL UNIVERSE

(75) Inventors: Gregory J. Boss, Saginaw, MI (US); Rick A. Hamilton, II, Charlottesville, VA (US); Michael D. Kendzierski, New York, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 12/341,256

(22) Filed: Dec. 22, 2008

(65) Prior Publication Data

US 2010/0161456 A1  Jun. 24, 2010

(51) Int. Cl.
  *G06F 17/30* (2006.01)
(52) U.S. Cl.
  USPC .................................... 715/706; 709/204
(58) Field of Classification Search
  USPC .......................................... 715/706; 709/204
  See application file for complete search history.

(56) References Cited

U.S. PATENT DOCUMENTS

| | | | |
|---|---|---|---|
| 5,956,038 A | 9/1999 | Rekimoto | |
| 6,009,460 A | 12/1999 | Ohno et al. | |
| 6,020,885 A | 2/2000 | Honda | |
| 6,154,211 A | 11/2000 | Kamachi et al. | |
| 6,346,956 B2 | 2/2002 | Matsuda | |
| 6,437,777 B1 | 8/2002 | Kamachi et al. | |
| 6,493,001 B1 | 12/2002 | Takagi et al. | |
| 6,570,563 B1 | 5/2003 | Honda | |
| 6,772,195 B1 * | 8/2004 | Hatlelid et al. | 709/204 |
| 6,820,112 B1 * | 11/2004 | Matsuda et al. | 709/203 |
| 6,981,220 B2 * | 12/2005 | Matsuda | 715/706 |
| 7,086,005 B1 * | 8/2006 | Matsuda | 715/706 |
| 8,051,462 B2 * | 11/2011 | Hamilton et al. | 726/2 |
| 2003/0080989 A1 * | 5/2003 | Matsuda et al. | 345/706 |
| 2005/0015725 A1 * | 1/2005 | Matsuda | 715/706 |
| 2007/0162863 A1 * | 7/2007 | Buhrke et al. | 715/757 |
| 2008/0268418 A1 * | 10/2008 | Tashner et al. | 434/365 |
| 2009/0271205 A1 * | 10/2009 | Finn et al. | 705/1 |
| 2009/0276704 A1 * | 11/2009 | Finn et al. | 715/706 |

* cited by examiner

*Primary Examiner* — Kim Nguyen
(74) *Attorney, Agent, or Firm* — William E. Schiesser; Keohane & D'Alessandro, PLLC (57) ABSTRACT

An approach that provides sharing of the same virtual space by a plurality of avatars in a virtual universe by grouping the avatars belonging the virtual space and isolating each group. In one embodiment, there is an isolating tool, including a grouping component configured to group each of the plurality of avatars belonging to defined virtual space according to predefined grouping criteria. The isolating tool further includes an isolating component configured to isolate each group within each of the plurality of virtual spaces based on the grouping.

24 Claims, 8 Drawing Sheets

SHARING VIRTUAL SPACE IN A VIRTUAL UNIVERSE

FIELD OF THE INVENTION

This invention relates generally to virtual universes and more specifically to the sharing of the same virtual space by a plurality of avatars in a virtual universe.

BACKGROUND OF THE INVENTION

Virtual universes (VUs) or virtual worlds are computer-based simulated environments intended for its users or residents to inhabit and interact via avatars, which are personas or representations of the users of the virtual universes. These types of virtual universes are now most common in massively multiplayer online games such as Second Life®, which is a trademark of Linden Research Inc. in the United States. Avatars in these types of virtual universes, which can number well over a million, have a wide range of business and social experiences.

Many areas within a virtual universe are popular leading to areas becoming overcrowded or full. When an area becomes overcrowded or full, movement and response times slow down preventing effective interaction with the environment. When an area becomes full, prior art virtual universes manage this problem by creating a new 'instance' (or duplicate) of the environment to support a new set of avatars. This requires significant resources and skill in order to expand and create a virtual world that can accommodate multiple instances of a defined space. This may not provide an optimal experience, as most users do not like overcrowding or slow response times. Virtual space owners do not like the added computing resources needed to manage a virtual world with a high number of avatar interactions within a small space.

SUMMARY OF THE INVENTION

Embodiments of this invention are directed to sharing the same virtual space in a virtual universe, such that overcrowding and wait times for the rendering of virtual content (i.e., objects, textures and scripts) in the virtual space are reduced. In these embodiments, an isolating tool provides the capability to share the same virtual space in a virtual universe. Specifically, each of a plurality of avatars belonging to a defined virtual space is separated into a group. The groups of avatars are isolated from one another so they may exist in the same virtual space without overcrowding or need to duplicate the virtual environment. As used herein, isolating is defined as the applying visibility and transparency properties among avatars that are in different groups so that one group may or may not be visible to another group, yet still occupy the same virtual space. The term 'visibility' refers to visual, audio, chat, and physical isolation among groups so that they do not interfere with one another in the same virtual space.

In one embodiment, there is a method for isolating a plurality of avatars belonging to a virtual space in a virtual universe. In this embodiment, the method comprises: accessing a predefined grouping method associated with the virtual space; accessing grouping information associated with each of the plurality of avatars belonging to the virtual space based the predefined grouping method; grouping each of the plurality of avatars belonging to the virtual space according to the predefined grouping method and grouping information; and isolating each of the plurality of avatars belonging to the virtual space based on the grouping.

In a second embodiment, there is a computer system for isolating a plurality of avatars belonging to a virtual space in a virtual universe. In this embodiment, the system comprises at least one processing unit and memory operably associated with the at least one processing unit. An isolating tool is storable in memory and executable by the at least one processing unit. The isolating tool comprises a grouping component configured to access a predefined grouping method associated with the virtual space and grouping information associated with each of the plurality of avatars and group each of a plurality of avatars belonging to the virtual space according to the predefined grouping method and grouping information; and an isolating component configured to isolate a plurality of avatars belonging to the virtual space based on the grouping.

In a third embodiment, there is a computer-readable medium storing computer instructions, which when executed, enables a computer system to provide isolating of a plurality of avatars in a virtual space. In this embodiment, the computer instructions comprise: accessing a predefined grouping method associated with the virtual space and grouping information associated with each of the plurality of avatars; grouping each of the plurality of avatars belonging to the virtual space according to the predefined grouping method and grouping information; and isolating each of the plurality of avatars belonging to the social space based on the grouping.

In a fourth embodiment, there is a method for deploying an isolating tool for use in a computer system that provides isolating of a plurality of avatars belonging to a virtual space. In this embodiment, a computer infrastructure is provided and is operable to: access a predefined grouping method and grouping information associated with each of the plurality of avatars belonging to the virtual space; group each of a plurality of avatars belonging to a virtual space according to the predefined grouping method and grouping information; and isolate each of the plurality of groups belonging to the virtual space based on the grouping.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to sharing the same virtual space in a virtual universe, such that overcrowding and wait times for the rendering of virtual content (i.e., objects, textures and scripts) in the virtual space are reduced. In these embodiments, an isolating tool provides the capability to share the same virtual space in a virtual universe. Specifically, each of a plurality of avatars belonging to a defined virtual space is separated into a group. The groups of avatars are isolated from one another so they may exist in the same virtual space without overcrowding or need to duplicate the virtual environment. As used herein, isolating is defined as the applying visibility and transparency properties among avatars that are in different groups so that one group may or may not be visible to another group, yet still occupy the same virtual space. The term 'visibility' refers to visual, audio, chat, and physical isolation among groups so that they do not interfere with one another in the same virtual space.

Figure 1:
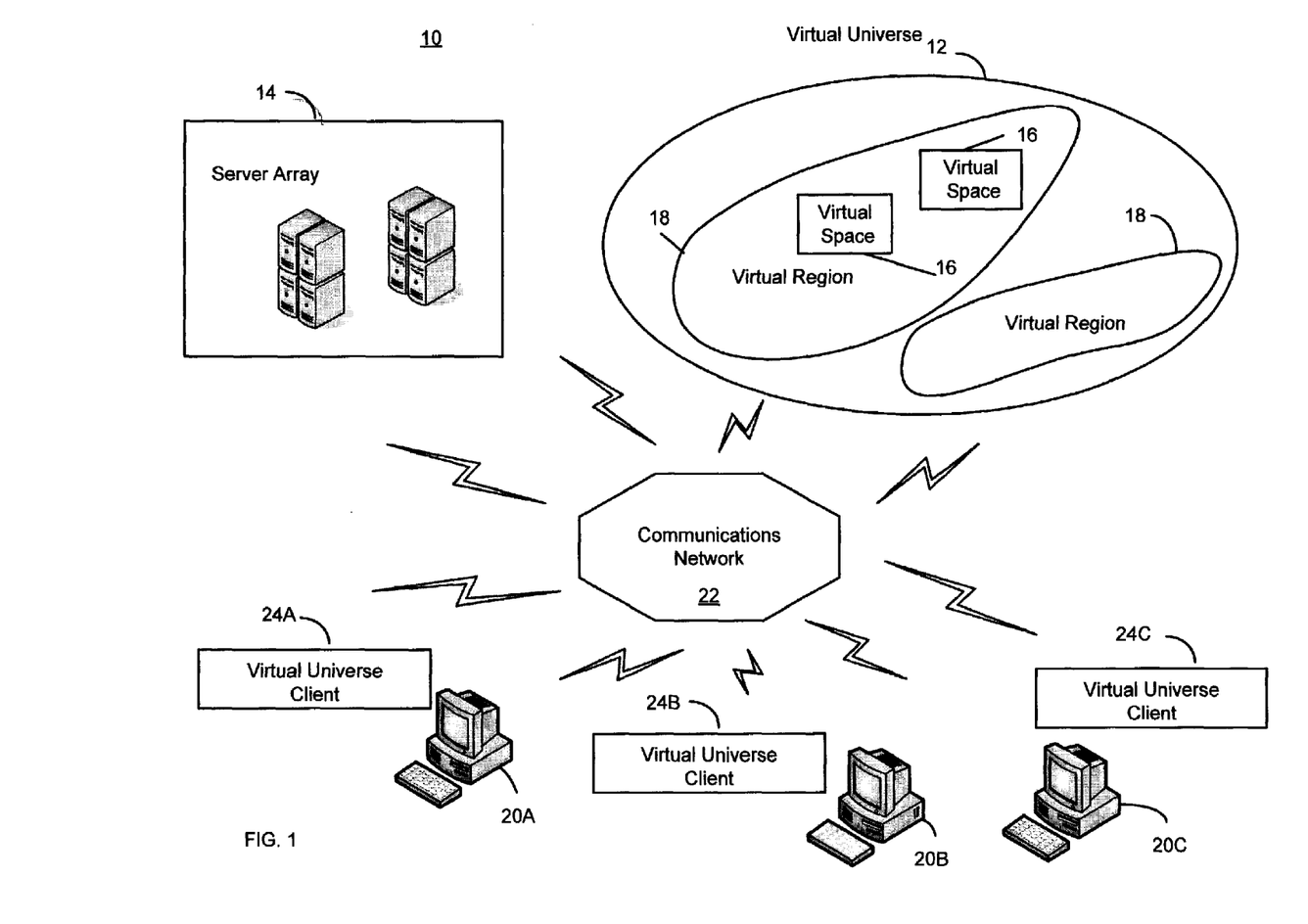
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a service for sharing a virtual space can be utilized. As shown in FIG. 1, networking environment 10 comprises a server array or grid 14 comprising a plurality of servers 16, each responsible for managing a portion of areas within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures and scripts. Like the real-world, each virtual region 18 within virtual universe 12 comprises a landscape having virtual content, such as buildings, stores, clubs, sporting arenas, parks, beaches, cities and towns all created by residents of the universe represented by avatars. The examples of virtual content are only illustrative of some things that may be found in a virtual region and are not limiting. Furthermore, the number of virtual regions 18 shown in FIG. 1 is only for illustration purposes and those skilled in the art will recognize that there may be many more regions in a typical virtual universe, or even only one region in a small virtual universe.

FIG. 1 further depicts virtual spaces 16 defined within virtual region 18. A virtual space may consist of a room, a building, a city, or a continent. These examples of virtual spaces are only illustrative of some areas that may be defined as virtual spaces and are not limiting. Furthermore, the number of virtual spaces 16 shown in FIG. 1 is only for illustration purposes and those skilled in the art will recognize that there may be many more virtual spaces defined in a typical virtual region, or even no virtual spaces in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

Figure 2:
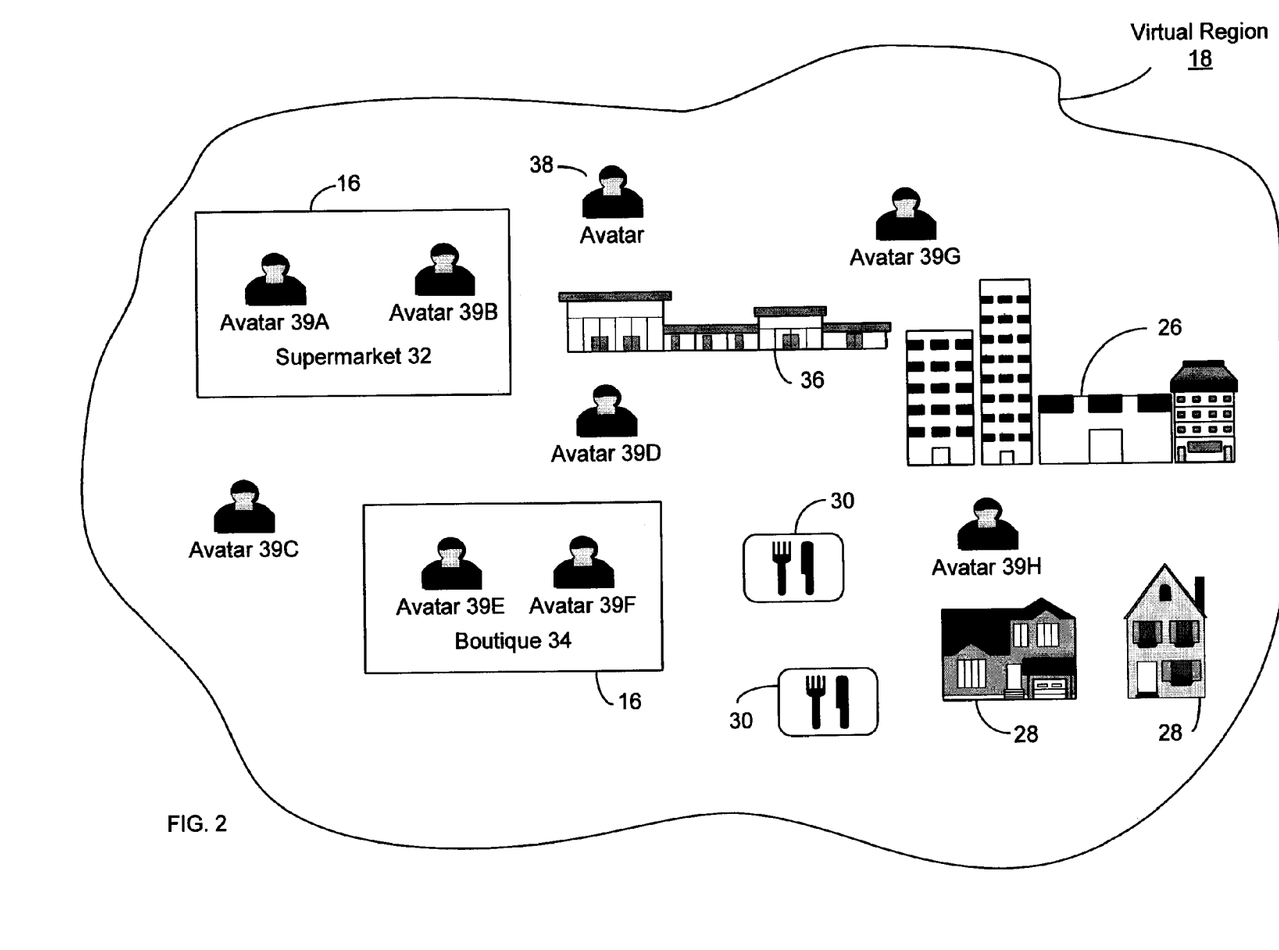
FIG. 2 shows a more detailed view of a virtual region shown in the virtual universe of FIG. 1.

FIG. 2 shows a more detailed view of an exemplary virtual region found in virtual universe 12. As an example, virtual region 18 shown in FIG. 2 includes areas defined as virtual spaces, including: supermarket 32 and boutique 34 for shopping. A downtown office center 26, homes 28, restaurants 30 and strip mall 36 are not defined as virtual spaces within virtual region 18. A virtual space is an area within virtual region 18 that enforces the properties of avatar group isolation, as discussed in more detail below. An avatar 38, which as mentioned above, is a persona or representation of a user of the virtual universe, roams all about the virtual region by walking, driving, flying or even by teleportation or transportation, which is essentially moving through the virtual universe from one point to another, more or less instantaneously. FIG. 2 also depicts a plurality of other avatars 39A-39H (hereinafter referred generally as 39) residing in virtual region 18. Although the invention is described in the context of a single avatar's interaction with other avatars in a virtual space, those skilled in the art will recognize that virtual universe 12 can have any number of avatars, virtual regions, virtual spaces, and any number of combinations thereof.

Figure 3:
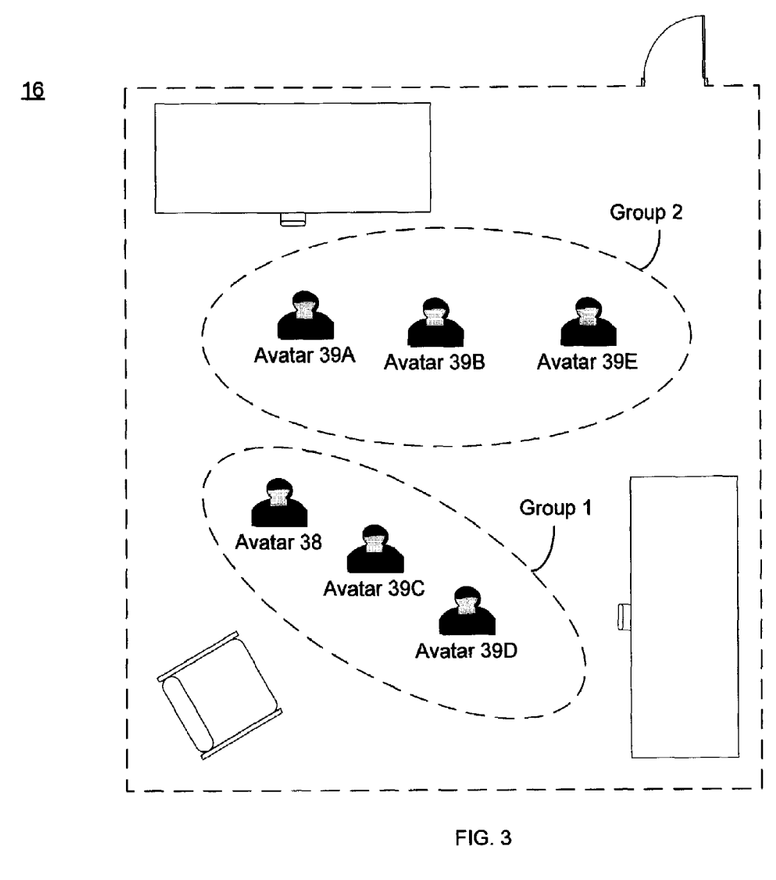
FIG. 3 shows a more detailed view of a virtual space shown in the virtual region of FIG. 1.

FIG. 3 shows a more detailed view of an exemplary virtual space found in virtual region 18. As an example, a room shown in FIG. 3 defined as virtual space 16 includes six avatars. When avatar 38 enters room, the six avatars are separated into two groups, as discussed in more detail below.

Figure 4:
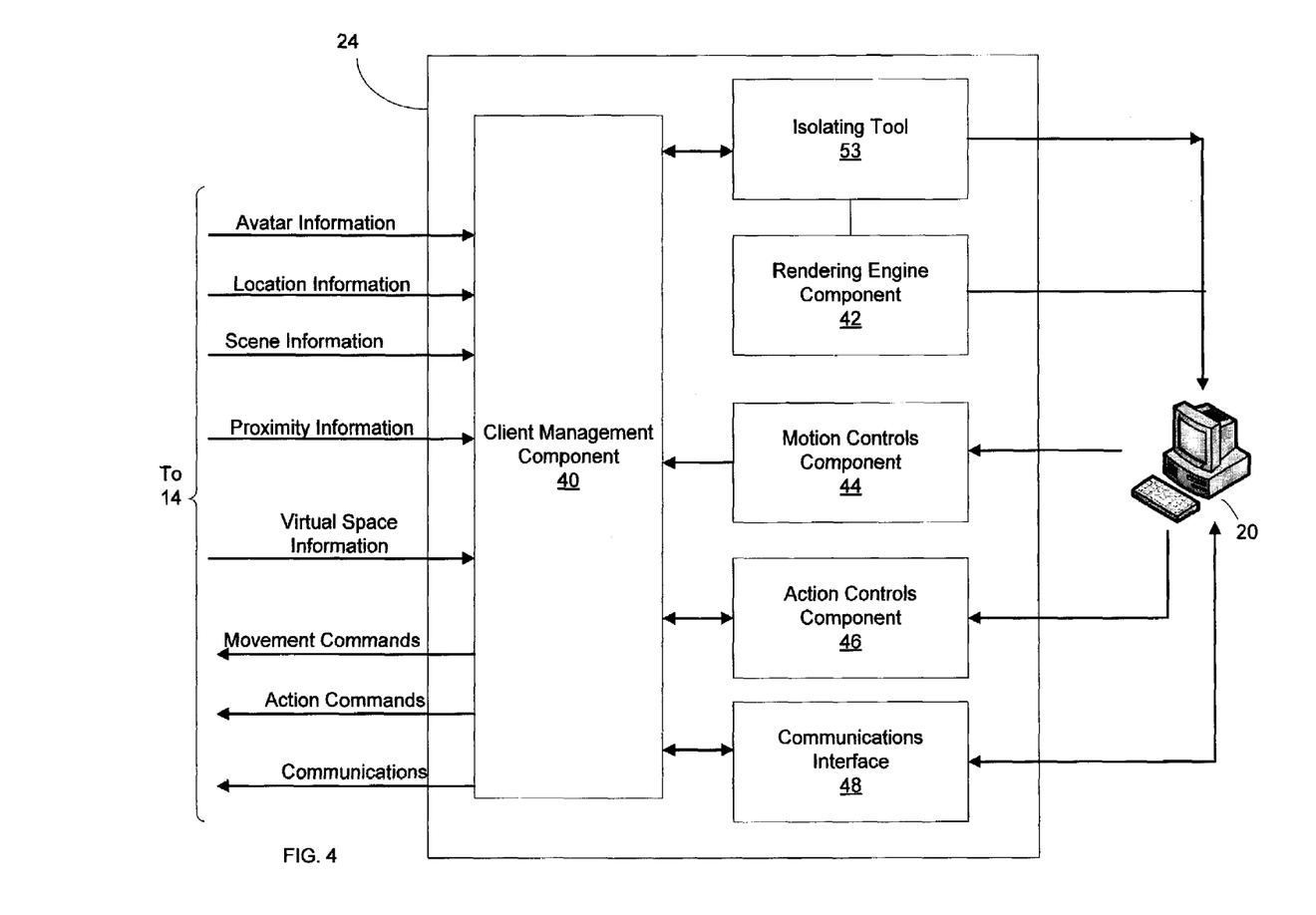
FIG. 4 shows a more detailed view of the virtual universe client shown in FIG. 1.

FIG. 4 shows a more detailed view of virtual universe client 24 shown in FIG. 1. Virtual universe client 24, which enables users to interact with virtual universe 12, comprises a client management component 40, which manages actions, movements and communications made by a user through computer 20, as well as information received from virtual universe 12 through server array 14. A rendering engine component 42 enables the user of computer 20 to visualize his or her avatar within the surroundings of the particular region of virtual universe 12 where the avatar is presently located.

A motion controls component 44 enables the user to make movements through the virtual universe. Movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking and electronic mail (e-mail).

An isolating tool 53 allows for sharing the same virtual space within the virtual universe, as will be further described below. As shown in FIG. 4, in the exemplary embodiment, isolating tool 53 resides on the same computer system as virtual universe client 24. In other embodiments, isolating tool 53 might reside on the same side as server array 14, or reside on separate computers in direct communication with virtual universe servers 16 and virtual universe client 24.

FIG. 4 shows the various types of information received by client management component 40 from the virtual universe through server array 14. In particular, client management component 40 receives location information about the area that the user's avatar is near (e.g., what region or land he or she is in), as well as scene information (e.g., what the avatar sees). Client management component 40 also receives information from a virtual region database (shown in FIG. 5), including information identifying the location of each virtual space 16 within virtual region 18, as well as the grouping method and interaction method to be applied to avatars in each virtual space 16.

Client management component 40 also receives transparency information, which contains information relating to how groups are isolated in virtual space 16. FIG. 4 also shows the movement and action commands that are generated by the user and sent to the server array via client management component 40, as well as the communications that can be sent to other avatars within virtual universe 12.

Figure 5:
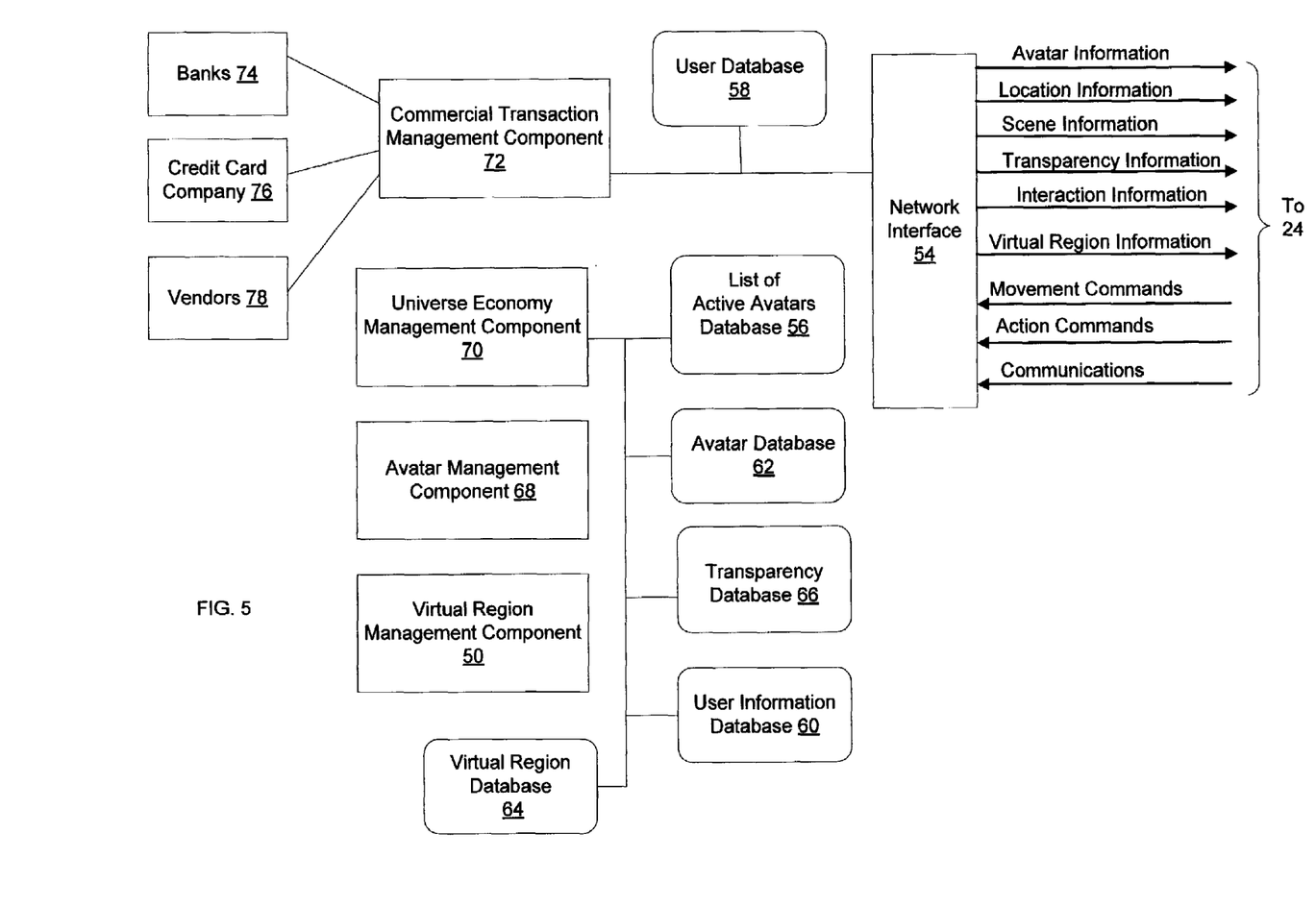
FIG. 5 shows a more detailed view of some of the functionalities provided by the server array shown in FIG. 1.
Figure 6:
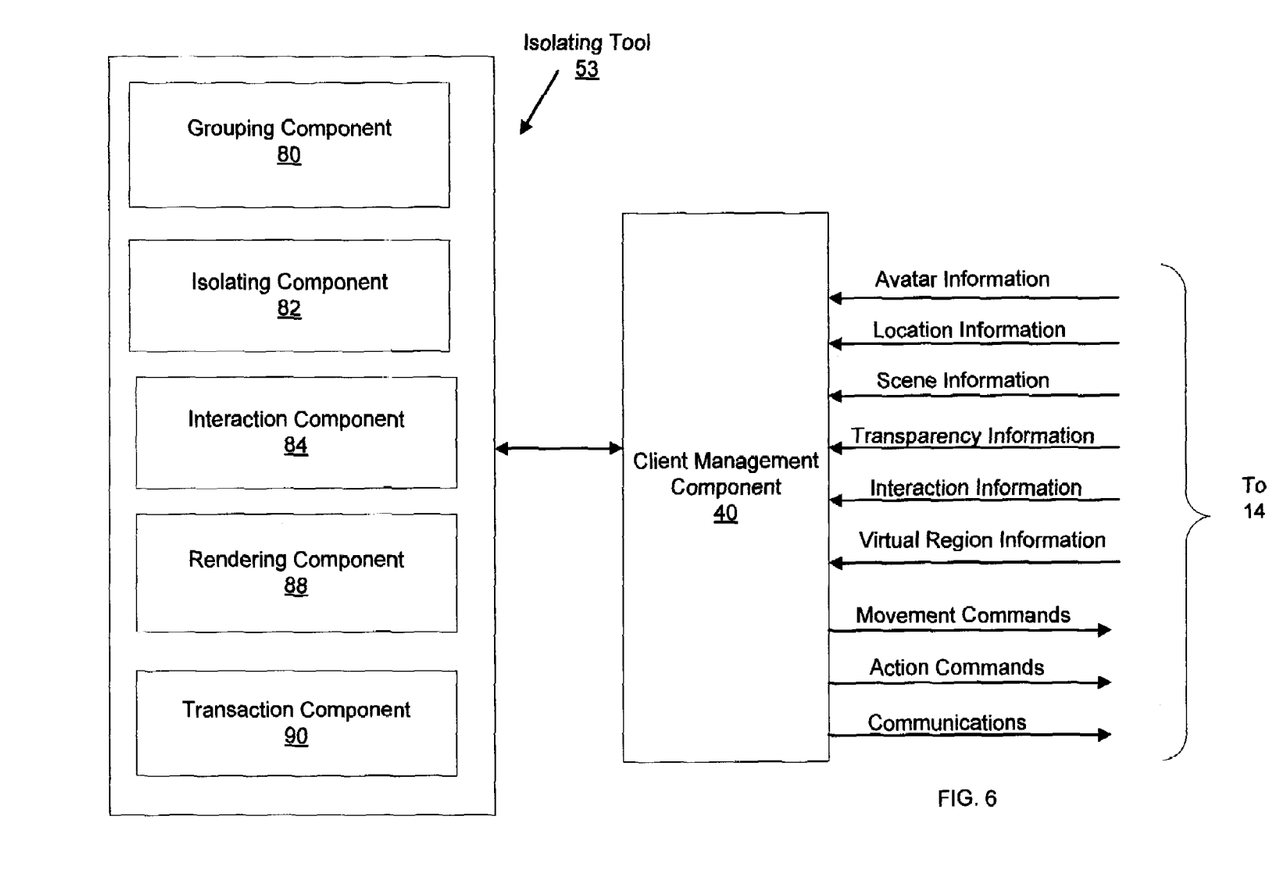
FIG. 6 shows an isolating tool according to one embodiment of this invention that operates in the environment shown in FIG. 1.

FIG. 5 shows a more detailed view of some of the functionalities provided by server array 14 shown in FIG. 1. In particular, FIG. 6 shows a virtual region management component 50 that manages a virtual region(s) within the virtual universe. Virtual region management component 50 manages what happens in a particular region, the number of homes, commercial zones, boutiques, streets, parks, restaurants, etc.

Furthermore, virtual region management component 50 allows the owner of a particular region or establishment within the region to define a location(s) as a virtual space and specify the rule sets governing the virtual space. For example, virtual region management component 50 would allow the owner of a particular region to define a plurality of areas subject to overcrowding as virtual spaces and specify grouping method and interaction method is to be employed within each virtual space. The owner may also define for each virtual space a rule set which determines how many groups are created and how many avatars exist within each group. These are examples of rule sets that may be defined for virtual space 16 and are not limiting. Those skilled in the art will recognize that virtual region management component 50 can manage many other facets within the virtual region.

FIG. 5 shows a network interface 54 that enables server array 14 to interact with virtual universe client 24 residing on computer 20. In particular, network interface 54 communicates avatar, location, scene, transparency, interaction, and virtual region information to the user through virtual universe client 24. The network interface receives movement and action commands, as well as communications from the user via virtual universe client 24.

As shown in FIG. 5, there are several different databases for storing information. In particular, virtual region database 64 stores information on all of the specifics in virtual region 18 that virtual region management component 50 is managing. Specifically, virtual region database 64 contains metadata information about the objects, texts and scripts associated with the virtual content in the virtual region. Furthermore, virtual region database 64 also contains metadata information relating to each virtual space 16 in virtual region 18, such as location, grouping method and interaction method, as discussed above. In one embodiment, for very large virtual universes, one server 16 may be responsible for managing one particular virtual region 18 within the universe. In other embodiments, it is possible that one server 16 may be responsible for handling one particular land within virtual region 18.

Database 56 contains a list of all the avatars that are online in the virtual universe 12, while databases 58 and 60 contain information on the actual human users of virtual universe 12. In one embodiment, database 58 contains general information on the users such as names, addresses, interests, ages, etc., while database 60 contains more sensitive information on the users such as email addresses, and billing information (e.g., credit card information) for taking part in transactions. Databases 62 and 64 contain information on the avatars of the users that reside in virtual universe 12. In one embodiment, avatar database 62 contains information such as all of the avatars that a user may have, the profile of each avatar, and avatar characteristics (e.g., appearance, voice and movement features). Avatar database 62 also contains grouping information allowing each of the plurality of avatars to be grouped while residing in virtual space 16. In an exemplary embodiment, grouping information associated with an avatar is dynamically updated when a relevant change to the avatar occurs.

Those skilled in the art will recognize that databases 58-64 may contain additional information if desired. Databases 58-64 may be consolidated into a single database or table, divided into multiple database or tables, or clustered into a database system spanning multiple physical and logical devices. Further, although the above information is shown in FIG. 5 as being stored in databases, those skilled in the art will recognize that other means of storing information can be utilized.

An avatar management component 68 keeps track of what the avatars are doing while in the virtual universe. For example, avatar management component 68 can track where each avatar presently is in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own currency that users pay for with real-world money. The users can then take part in commercial transactions for their avatars through universe economy management component 70. For example, an avatar might want to pay for a service that provides this isolating capability. In this case, the avatar would purchase this service using the virtual universe currency. In some instances, the user may want to take part in a commercial transaction that benefits the user and not an avatar. For example, while walking around a commercial zone, a user may see a pair of shoes that he or she would like for themselves and not their avatar. A commercial transaction management component 72 allows the user to participate in the transaction. In order to fulfill this type of transaction and others similarly related, commercial transaction management component 72 interacts with banks 74, credit card companies 76 and vendors 78.

Referring now to FIGS. 2 and 6, isolating tool 53 of the present invention will be described in further detail. As mentioned above, isolating tool 53 provides the capability to allow a plurality of avatars to share the same virtual space by isolating a plurality of avatar groups in virtual space 16. As it is possible that virtual space 16 may contain a large number of avatars with varying interests and affiliations, it is generally undesirable to the user to be placed within a group indiscriminately. Therefore, isolating tool 53 comprises a grouping component 80 configured access a predefined grouping method and information associated with each of the plurality of avatars to group each of the plurality of avatars belonging to virtual space 16.

The action of avatar 38 crossing a virtual space boundary creates a trigger to group avatar 38 and avatars 39. Virtual space owner defines grouping method to be used. Based on grouping method, groups are created using information associated with each of the plurality of avatars. The information may include metadata associated with each avatar, such as company, faction, guild or other association. These examples are only illustrative of some of the grouping information that may be used and is not limiting. Grouping component 80 accesses the grouping method and polls the relevant information of each avatar residing in virtual space 16 based on grouping method to group each avatar. To accomplish the separation, each avatar is assigned a group identifier and then grouped according to group membership. In an exemplary embodiment, a grouping method is chosen that will create workable groups in virtual space 16 to avoid overcrowding and lessen response and rendering times making for a better user experience.

In one implementation of the present invention, the avatars of virtual space 16 depicted in FIG. 3 are separated into two logical groups. Logical groups are static in nature and contain one or more avatars having a logical relationship to one another that fall into a well-defined set of criteria. When avatar 38 enters virtual space 16 joining avatars 39A-39E, the six avatars are grouped based on grouping method and information associated with each of the avatars. Referring to the grouping method below, which is described in the context of Tables 1, one possible method of implementing the described grouping method is shown. In this example, avatars 39 reside in a virtual space. When avatar 38 crosses into the virtual space, the avatars are grouped. The company name has been selected as the grouping information to be used and is determinative as to how each avatar is grouped.

TABLE 1

| Avatar | Group Number | Company |
|---|---|---|
| 38 | 1 | ACME Greeting Card Co. |
| 39A | 2 | ACME Toys |
| 39B | 2 | ACME Toys |
| 39C | 1 | ACME Greeting Card Co. |
| 39D | 1 | ACME Greeting Card Co. |
| 39E | 2 | ACME Toys |

As shown in Table 1, avatar company names used for grouping avatars.

Grouping component queries each avatar's company name and assigns a group identifier (for example, a group number) to each avatar. Therefore, the six avatars listed in the table are separated into two groups: Group 1 and Group 2. The avatars having company 'ACME Greeting Card Co.' are assigned to Group 1. The avatars having 'ACME Toys.' are assigned to Group 2. Group identifier for each avatar is maintained in avatar database 62. Groups are isolated based on group membership, as discussed in more detail below.

In another implementation, the avatars of virtual space 16 are separated into dynamic groups. Dynamic groups are based on group metadata that change at any given time based upon the properties of the group. For example, dynamic groups may be created based upon the score of individual avatars such as those in a game environment or the performance of avatars in a business environment. For example, there may be 1,000 avatars sharing the same 4-story building in a game. The virtual space is the entire 4-story building and the top 50 players are dynamically grouped (by score) in Group 1, the next 50 highest in Group 2, and so on until all 20 groups are defined. If the top-scoring player of Group 2 exceeds the score of the lowest player in Group 1, he is promoted to that higher tier. Similarly, in a business setting, employee avatars of similar skill may be dynamically grouped. As soon as an employee rises above a certain threshold, the employee would move out of one group into another group.

Referring back to FIG. 5, isolating tool further comprises isolating component to isolate groups of avatars in virtual space 16. Group isolation is maintained by applying visibility and transparency properties between avatars. Group isolation provides not only visual isolation for the various sets of users sharing a same space, but it also allows isolation of chat and audio content among the groups sharing the same space. For example, members of one group will not see the chats or hear the conversations of members of another group. Isolating component keeps track of group identifier and restricts the flow and presentation of such communications. Each member of the same group is visible to the other members of that group but transparency between avatars of differing groups is complete.

In one embodiment, transparency rules are maintained in transparency database 66. The rule set to specify transparency may be implemented through a table describing the interactions of one group to another, as shown below in Table 2.

TABLE 2

| % Transparency | Group 1 | Group 2 | Group 3 |
|---|---|---|---|
| Group 1 | 0 | 100 | 100 |
| Group 2 | 100 | 0 | 100 |
| Group 3 | 100 | 100 | 0 |

As shown in Table 2, transparency percentages among three groups. Essentially, referring to the table below, the avatars of Groups 2 and 3 are invisible to avatars of Group 1 although all three groups occupy the same virtual space.

As shown in FIG. 6, isolating tool also comprises an interaction component 84 to control the interaction of an avatar in one group with avatars of other groups. Although the avatars are isolated within groups, indirect interaction between avatars of different groups is possible. Avatars otherwise isolated from each other can see, interact, and modify the shared environment. Avatar A in Group 1 can rearrange furniture in a room which can be seen by Avatar B in Group 2. Avatar C, if present during the time the object was moved, can view the object in motion. Interaction methods include: multifarious interaction, object locking, and weighted interaction.

In one implementation, a multifarious interaction method is used when avatars of different groups come into contact. With multifarious interaction, any object within virtual space can have interaction with any of the avatars regardless of group membership. For example, two or more avatars can attempt to interact with an object. One avatar may be sitting in a chair and another avatar may attempt to move that chair. Depending on the capabilities of the avatar (weight of avatar of Group 1 vs. strength of avatar of Group 2), the chair may be moved slowly or not at all.

In another implementation using object locking, a first interaction with an object can lock that object for a predetermined amount of time. In this case, the avatar that begins to interact with an object maintains control of that object until either a time-out occurs or interaction ceases. Referring to the chair example described above, avatar of Group 2 would not be able to move the chair regardless of how strong he is because avatar of Group 1 first locked the chair by sitting in it.

In another implementation using weighted interaction, a first interaction is compared to a second interaction to determine by a weighted list which interaction is honored. In this case one avatar may have more "rights" than another avatar. For example avatars of Group 1 may have a higher weight or priority than avatars of Group 2. In such a scenario avatar of Group 2 may be writing on a white-board when avatar of Group 1 takes the pen and begins writing something else. Because avatar of Group 1 has a higher priority than avatar of Group 2, the pen is released from avatar of Group 2 and control transferred to avatar of Group 1.

As further shown in FIG. 6, isolating tool 53 comprises a rendering component 88 configured to render the virtual content of virtual space 16 after any isolating of groups is complete. As used herein, rendering is the process of producing the pixels of an image from a higher-level description of its components. Additionally, rendering is the process of generating an image from a model, by means of computer programs. The model is a description of three-dimensional objects in a strictly defined language or data structure. Models contain geometry, viewpoint, texture, lighting, and shading information.

In one embodiment, isolating tool 53 is used to 'rent' space to several sets of residents so that they may share the same rooms, but with privacy (e.g., privacy such as the aforementioned visual and communication isolation). For example, a rental management component allows sets of residents to pay a fraction of the rent as appropriate according to usage. As shown in FIG. 6, isolating tool 53 comprises a transaction component 90 configured to charge an isolating fee for isolating the plurality of groups in a virtual space. In this embodiment, the provider of the virtual universe or a third party service provider could offer this isolating as a service by performing the functionalities described herein on a subscription and/or fee basis. In this case, the provider of the virtual universe or the third party service provider can create, deploy, maintain, support, etc., isolating tool 53 that performs the processes described in the invention. In return, the virtual universe or the third party service provider can receive payment from the virtual universe residents via universe economy management component 70 and commercial transaction management component 72.

In still another embodiment, the methodologies disclosed herein can be used within a computer system to provide isolating of the plurality of groups in a virtual space. In this case, isolating tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 7:
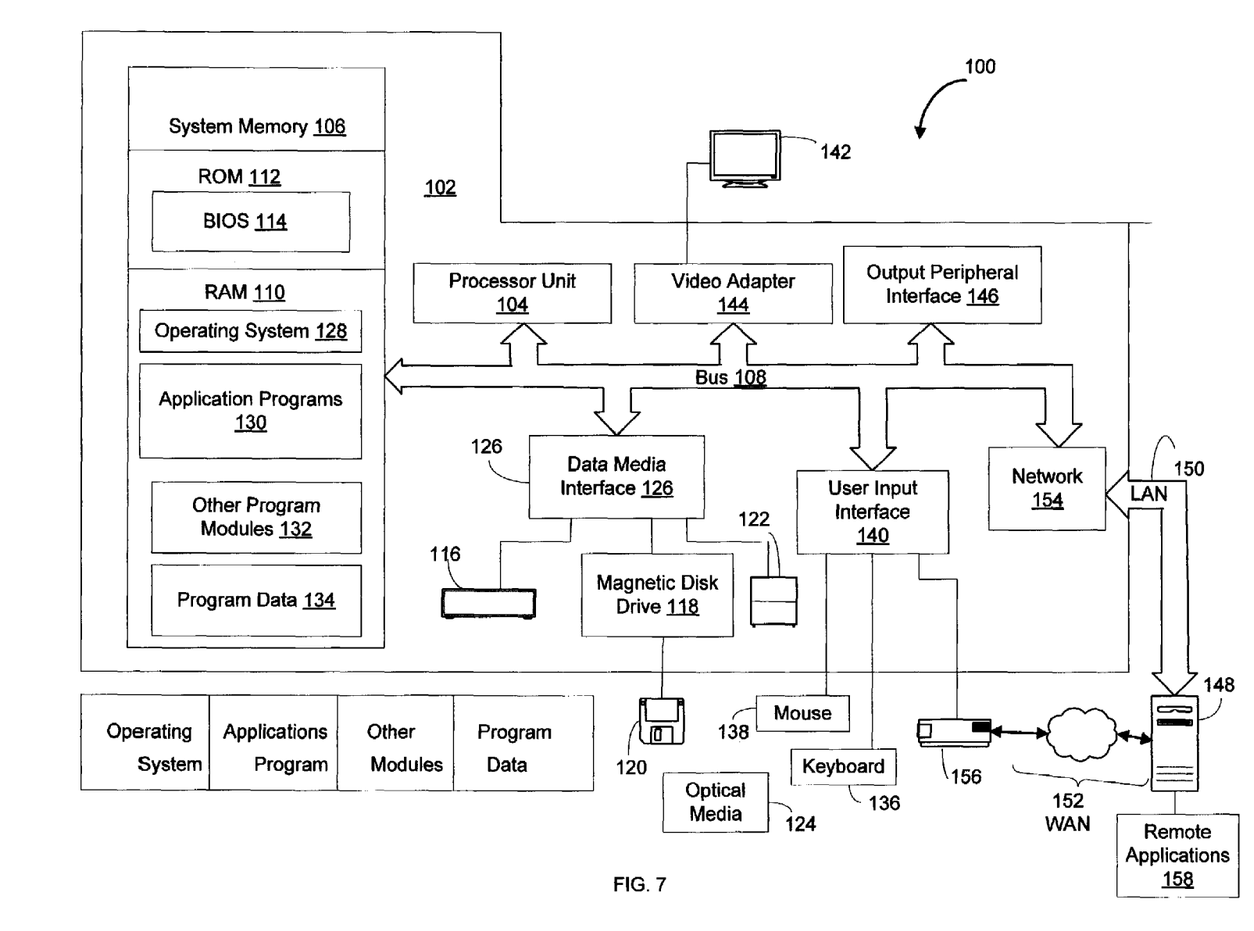
FIG. 7 shows a schematic of an exemplary computing environment in which elements of the networking environment shown in FIG. 1 may operate.

FIG. 7 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 7.

In the computing environment 100 there is a computer 102, which is operational with numerous other general purpose or special purpose computing system environments or configurations. Examples of well known computing systems, environments, and/or configurations that may be suitable for use with exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 7, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 7, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 7 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of operating system 128, one or more application programs 130 other program modules 132, and program data 134 or some combination thereof, may include an implementation of the networking environment 10 of FIG. 1 including server array 14, virtual universe client 24 and isolating tool 53. In one embodiment, the one or more application programs 130 include components of isolating tool 53 such as grouping component 80, isolating component 82, rendering component 88, and transaction component 90.

Figure 8:
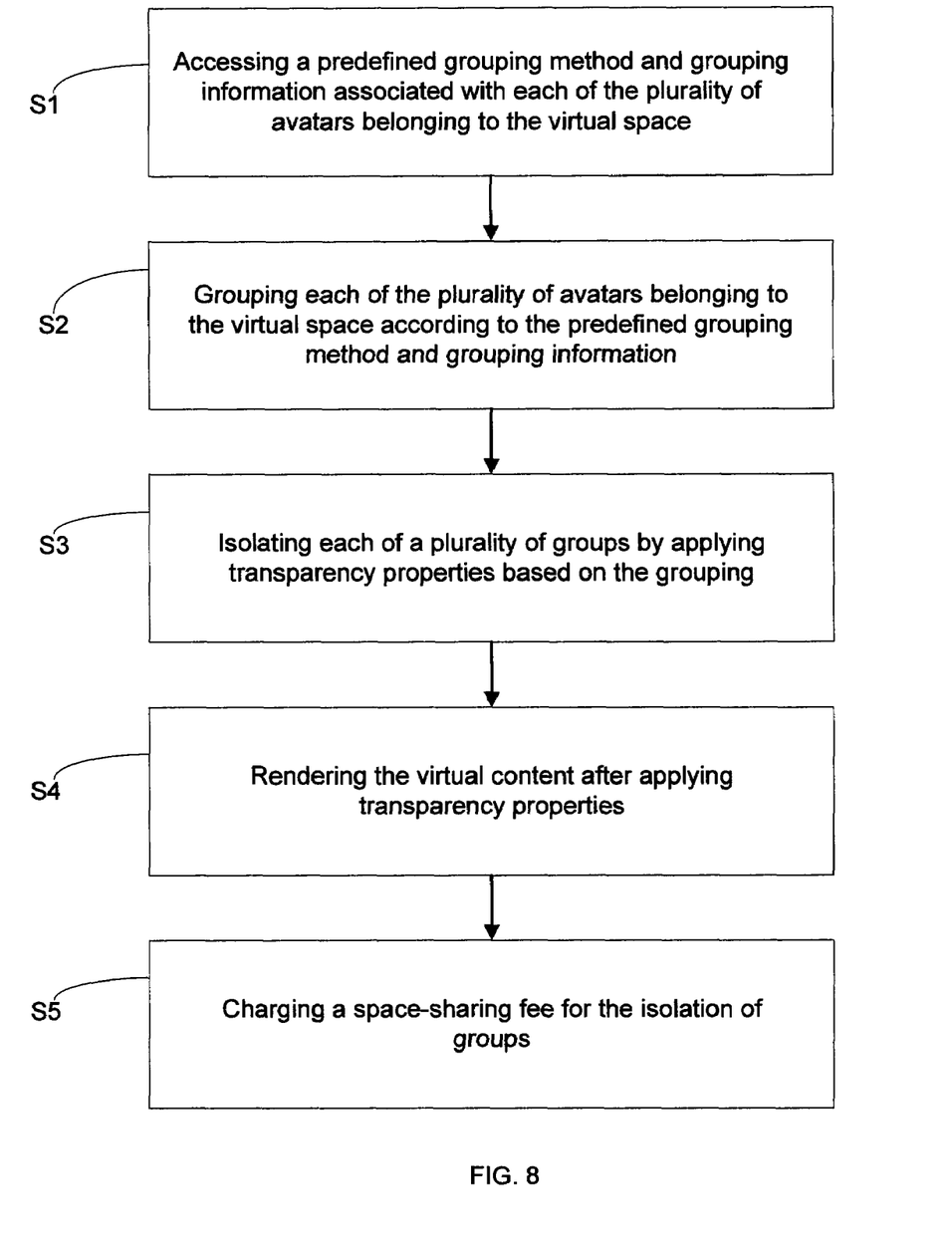
FIG. 8 shows a flow diagram of a method for sharing the same virtual space according to one embodiment of the invention.

The one or more program modules 130 carry out the methodologies disclosed herein, as shown in FIG. 8. According to one embodiment, in step S1, grouping method is accessed and information associated with each of a plurality of avatars in virtual space 16 is interrogated. In S2, each of the plurality of avatars belonging to the virtual space is grouped according to the grouping method and grouping information of each avatar and assigned a group identifier. In S3, each of the plurality of groups is isolated based on group identifier. In S4, the virtual content is rendered after applying transparency properties. In S5, An isolating fee for isolating the virtual content is charged.

The flowchart of FIG. 8 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 7, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 7 are a local area network (LAN) 150 and a general wide area network (WAN) 152. Such networking environments are commonplace in offices, enterprise-wide computer networks, intranets, and the Internet. When used in a LAN networking environment, computer 102 is connected to LAN 150 via network interface or adapter 154. When used in a WAN networking environment, the computer typically includes a modem 156 or other means for establishing communications over WAN 152. The modem, which may be internal or external, may be connected to system bus 108 via user input interface 140 or other appropriate mechanism.

In a networked environment, program modules depicted relative to computer 102, or portions thereof, may be stored in a remote memory storage device. By way of example, and not limitation, FIG. 7 illustrates remote application programs 158 as residing on a memory device of remote computer 148. It will be appreciated that the network connections shown and described are exemplary and other means of establishing a communications link between the computers may be used.

An implementation of computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In another embodiment, the invention provides a business method that performs the process of the invention on a subscription, advertising, and/or fee basis. That is, a service provider, such as a Solution Integrator, could offer to provide the functionality described herein. In this case, the service provider can create, maintain, support, etc., a computer infrastructure, such as computer infrastructure 102 (FIG. 4) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for performing the functionality described herein. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

It is apparent that there has been provided with this invention an approach for isolating virtual content within a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for isolating a plurality of avatars belonging to a virtual space in a virtual universe, comprising:
   accessing a predefined grouping method associated with the virtual space;
   accessing grouping information associated with each of the plurality of avatars belonging to the virtual space based the predefined grouping method;
   dynamically grouping each of the plurality of avatars belonging to the virtual space according to the predefined grouping method and grouping information, said dynamic grouping defined as changing grouping information upon each avatar's entry into a new virtual space; and
   isolating each of the plurality of avatars belonging to the virtual space based on the grouping, said groups being isolated from one another so they may exist in the same virtual space without overcrowding or a need to duplicate the virtual environment, said isolating comprising applying visibility and transparency properties among avatars based on said avatars' grouping information to allow for any one group to be isolated from other groups while occupying a same said virtual space, and while members of said group remain joined with each other, said visibility and transparency properties comprising video, audio, chat and physical isolation among groups so that said groups do not interfere with one another in the same virtual space.

2. The method according to claim 1 wherein accessing grouping information comprises accessing metadata associated with each of the plurality of avatars.

3. The method according to claim 1, the isolating each of the plurality of groups belonging to the virtual space comprises applying transparency properties to each of the plurality of groups.

4. The method according to claim 1 further comprising rendering the virtual content belonging to the virtual space based on the isolating of each of the plurality of groups.

5. The method according to claim 4 further comprising rendering the interaction of virtual content belonging to the virtual space based on a predefined interaction method.

6. The method according to claim 1 further comprising charging a fee for isolating each of the plurality of avatars belonging to the virtual space.

7. A computer system for isolating a plurality of avatars belonging to a virtual space in a virtual universe, comprising:
   at least one processing unit;
   memory operably associated with the at least one processing unit; and
   an isolating tool storable in memory and executable by the at least one processing unit, the isolating tool comprising:
      a grouping component configured to access a predefined grouping method associated with the virtual space and grouping information associated with each of the plurality of avatars and dynamically group each of the plurality of avatars belonging to the virtual space according to the predefined grouping method and grouping information, said dynamic grouping defined as changing grouping information upon each avatar's entry into a new virtual space; and
      an isolating component configured to isolate each of the plurality of avatars belonging to the virtual space based on the grouping, said groups being isolated from one another so they may exist in the same virtual space without overcrowding or a need to duplicate the virtual environment, said isolating comprising applying visibility and transparency properties among avatars based on said avatars' grouping information to allow for any one group to be isolated from other groups while occupying a same said virtual space, and while members of said group remain joined with each other, said visibility and transparency properties comprising video, audio, chat and physical isolation among groups so that said groups do not interfere with one another in the same virtual space.

8. The computer system according to claim 7, the grouping component configured to access grouping information comprises accessing metadata associated with each of the plurality of avatars belonging to the virtual space.

9. The computer system according to claim 7, the rendering component configured to isolate each of the plurality of groups belonging to the virtual space by applying transparency properties to each of the plurality of groups belonging to the virtual space.

10. The computer system according to claim 7 further comprising a rendering component configured to render the virtual content belonging to the virtual space based on the isolating of each of the plurality of groups belonging to the virtual space.

11. The computer system according to claim 10, the rendering component configured to render the interaction of virtual content belonging to the virtual space based on a predefined interaction method.

12. The computer system according to claim 7 further comprising a transaction component for charging an isolating fee for isolating each of the plurality of avatars belonging to the virtual space.

13. A computer-readable storage device storing computer instructions, which when executed, enables a computer system to provide isolating of a plurality of avatars in a virtual space belonging to a virtual space in a virtual universe, the computer instructions comprising:
- accessing a predefined grouping method associated with the virtual space and grouping information associated with each of the plurality of avatars;
- dynamically grouping each of the plurality of avatars belonging to the virtual space according to the predefined grouping method and grouping information, said dynamic grouping defined as changing grouping information upon each avatar's entry into a new virtual space; and
- isolating each of the plurality of avatars belonging to the virtual space based on the grouping, said groups being isolated from one another so they may exist in the same virtual space without overcrowding or a need to duplicate the virtual environment, said isolating comprising applying visibility and transparency properties among avatars based on said avatars' grouping information to allow for any one group to be isolated from other groups while occupying a same said virtual space, and while members of said group remain joined with each other, said visibility and transparency properties comprising video, audio, chat and physical isolation among groups so that said groups do not interfere with one another in the same virtual space.

14. The computer-readable storage device according to claim 13 further comprising wherein accessing grouping information comprises accessing metadata associated with each of the plurality of avatars.

15. The computer-readable storage device according to claim 13, the isolating of each of the plurality of avatars belonging to the virtual spaces comprises applying transparency properties to each of the plurality of groups.

16. The computer-readable storage device according to claim 13 further comprising instructions for rendering the virtual content belonging to the virtual space based on the isolating of each of the plurality of groups.

17. The computer-readable storage device according to claim 16, the rendering of the interaction of virtual content belonging to the virtual space based on a predefined interaction method.

18. The computer-readable storage device according to claim 13 further comprising instructions for charging an isolating fee for isolating each of the plurality of avatars belonging to the virtual space.

19. A method for deploying an isolating tool for use in a computer system that provides isolating of a plurality of avatars belonging to a virtual space in a virtual universe, the method comprising:
providing a computer infrastructure operable to:
- access a predefined grouping method and grouping information associated with each of the plurality of avatars belonging to the virtual space;
- dynamically group each of the plurality of avatars belonging to the virtual space according to the predefined grouping method and grouping information, said dynamic grouping defined as changing grouping information upon each avatar's entry into a new virtual space; and
- isolate each of the plurality of avatars belonging to the virtual space based on the grouping, said groups being isolated from one another so they may exist in the same virtual space without overcrowding or a need to duplicate the virtual environment, said isolating comprising applying visibility and transparency properties among avatars based on said avatars' grouping information to allow for any one group to be isolated from other groups while occupying a same said virtual space, and while members of said group remain joined with each other, said visibility and transparency properties comprising video, audio, chat and physical isolation among groups so that said groups do not interfere with one another in the same virtual space.

20. The method according to claim 19 wherein the computer infrastructure further operable to access grouping information comprising metadata associated with each of the plurality of avatars belonging to the virtual space.

21. The method according to claim 19 wherein the computer infrastructure further operable to isolate each of the plurality of groups belonging to the virtual space by applying transparency properties to each of the plurality of groups.

22. The method according to claim 19 wherein the computer infrastructure further operable to render the virtual content belonging to the virtual space based on the isolating of each of the plurality of groups.

23. The method according to claim 22 wherein the computer infrastructure further operable to render interaction among the virtual content belonging to the virtual space based on a predefined interaction method.

24. The method according to claim 19 wherein the computer infrastructure further operable to charge an isolating fee for isolating each of the plurality of avatars belonging to the virtual space.

* * * * *